June 1, 1937.  W. H. PARKER ET AL  2,082,717
COMBINED STRAINER, AIR ELIMINATOR, AND VACUUM BREAKER
Filed Dec. 3, 1934  2 Sheets-Sheet 1

INVENTORS.
WALTER H. PARKER
NELSON J. SEIBERT
FRANK S. BROOKS
BY
Strauch & Hoffman
ATTORNEYS

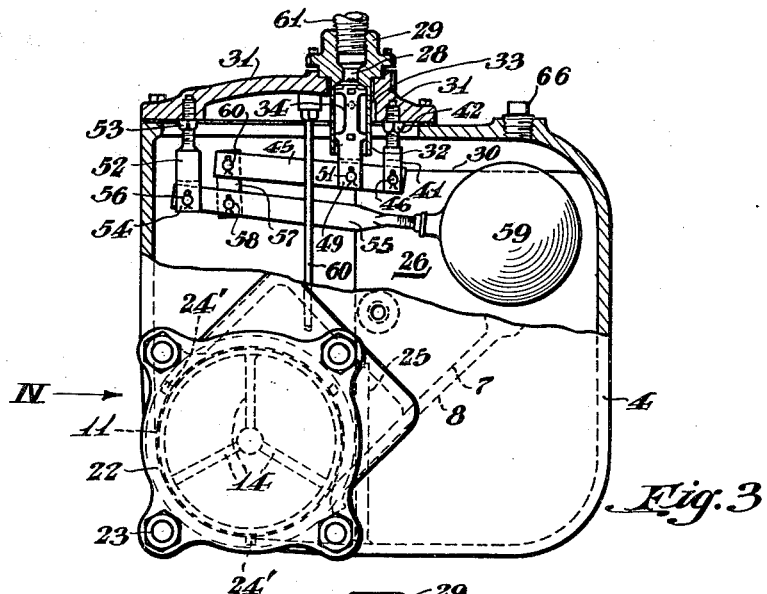
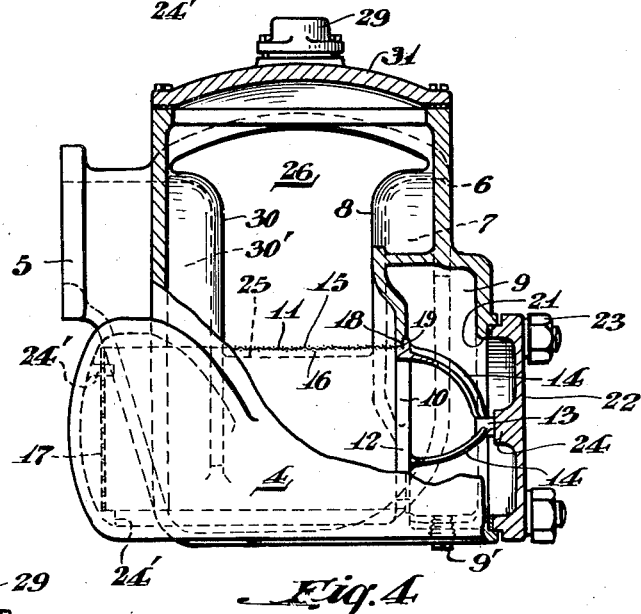
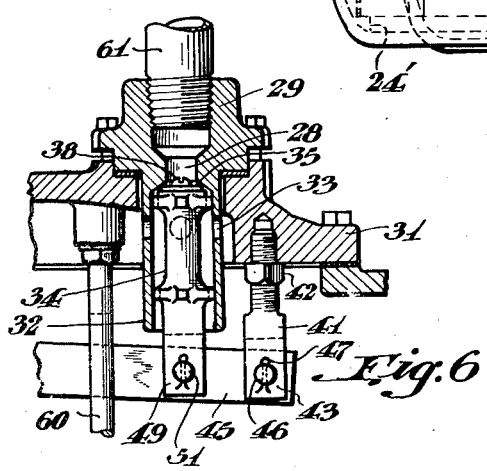
INVENTORS.
WALTER H. PARKER
NELSON J. SEIBERT
FRANK S. BROOKS
BY
Strauch & Hoffman
ATTORNEYS Patented June 1, 1937

2,082,717

UNITED STATES PATENT OFFICE 2,082,717

COMBINED STRAINER, AIR ELIMINATOR, AND VACUUM BREAKER

Walter H. Parker, Pittsburgh, Nelson J. Seibert, Wilkinsburg, and Frank S. Brooks, Edgewood, Pa., assignors to Pittsburgh Equitable Meter Company, Pittsburgh, Pa., a corporation of Pennsylvania Application December 3, 1934, Serial No. 755,834

3 Claims. (Cl. 183—2.5)

The present invention relates to a strainer, vacuum breaker and air eliminator for use in connection with fluid meters, particularly of the positive displacement type.

Under many conditions of use of a positive type of fluid meter, whether operated by gravity flow or by a pump, it is necessary to provide for elimination of air or vapor from the liquid to be measured because the meter will register entrained air as well as other fluid that passes through it. Also in gravity flow systems where a positive meter is employed, as for example, on a fuel oil or kerosene tank truck, there may be a relatively long hose connection from the outlet of the meter to the storage tank which is to be filled, and when the tank truck becomes empty the liquid in the hose would tend to draw air through the meter until the hose was emptied. This would result in an incorrect reading of the meter, as the air passing therethrough would be measured as if it were kerosene. Consequently, it is desirable to provide some means for breaking the vacuum created by the suction action of this liquid in the delivery line to prevent passage of air through the meter.

According to the present invention, we have provided a casing having an inlet and having a strainer positioned in the inlet to exclude foreign solids, and we provide in said casing a settling chamber for containing fluid in a substantially quiescent state to permit air or other gases entrained in the fluid to settle out of the liquid and rise to the top. Liquid is withdrawn adjacent the bottom of the settling chamber to the meter. A vapor vent valve is provided for discharge of gases from the chamber, this valve being operated by a float which in turn is controlled by the level of liquid in the settling chamber. A connection through a three-way valve is provided between the gas vent and the air chamber of the tank truck whereby gases and vapors with entrained liquid may be conducted back into the supply tank of the truck instead of into the atmosphere. This outlet may be connected by the three-way valve to the outlet of the meter to serve as a vacuum breaker. When connected in this way and delivery through the meter has been completed the liquid level in the settling chamber falls low enough to open the vapor vent valve and the air in the settling chamber is by-passed around the meter instead of passing through the meter, so that the suction effect of liquid in the discharge line does not cause gas or vapor to be passed through the meter.

Accordingly, it is an object in our invention to provide a combined air eliminator and vacuum breaker for use in combination with a positive meter, which will be of compact construction and simple in operation.

A further object is to provide a structure employing a combination of air eliminator and vacuum breaker for use with a fluid meter.

A further object is the provision of a compact structure containing a strainer adjacent a settling chamber provided with an air elimination valve.

Still a further object of our invention is to provide a novel still box arrangement that may be used in combination with a positive meter whereby all gases and vapors tending to produce inaccuracies in metering may be removed, additional means being preferably provided whereby such gases may be returned to the source of supply of the liquid being metered.

A further object of our invention resides in the provision of novel gas eliminating means in combination with a liquid meter of the positive type whereby the gas eliminating means may function as a vacuum breaker and prevent the registration of the meter of gases when the liquid flow therethrough has ceased due to the exhaustion of the source of supply.

These and other objects will be apparent from consideration of the following specification taken in connection with the accompanying drawings in which:

Figure 3 is an end view similar to Figure 2 on an enlarged scale partly in section;

Figure 4 is a side elevation partly in section looking in the direction of the arrow IV in Figure 3;

Figure 6 is an enlarged detail view of the air escape valve and operating levers;

Figure 1:
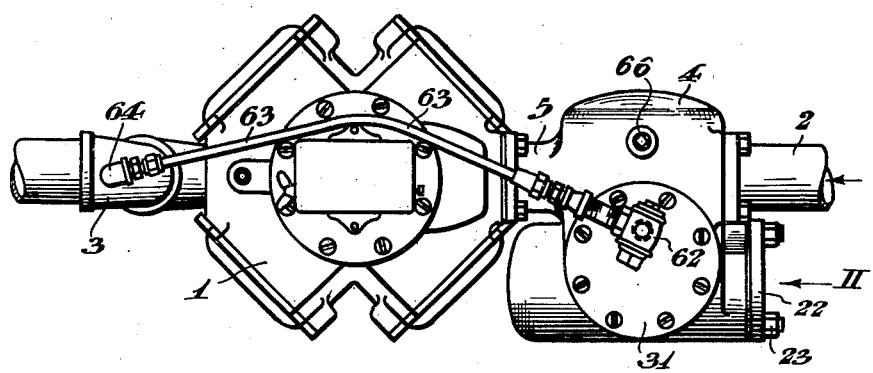
Figure 1 is a plan view in elevation of our invention applied to a piston meter.

Referring to the drawings, numeral 1 indicates a piston meter of suitable construction having an inlet connection and an outlet 3. Numeral 4 indicates the casing of our improved combination strainer, air eliminator and vacuum breaker having an outlet 5 adapted to be connected to the inlet of the piston meter, and an inlet 6, which in operation will be connected to the flanged discharge line 2 of the fuel oil tank truck or other suitable supply of liquid. Liquid enters the casing 4 through the inlet 6 and after being strained and settled is discharged through outlet 5 into the meter 1 from which it is then discharged through the outlet pipe 3 into a storage tank or other receptacle.

Figure 5:
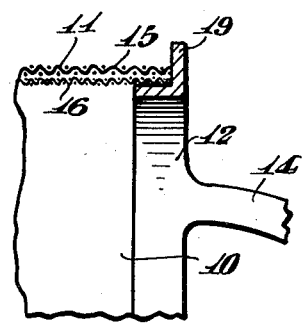
Figure 5 is a detail view showing the screen construction.

A passage 7 is formed through the casing by an integral wall 8 and the walls of the casing (Figure 4), and liquid is directed by the baffle wall 8 to the chamber 9 at the open end 10 of strainer 11, a drain plug 9' for this chamber being provided. This strainer comprises a heavy flanged reenforcing ring 12 (Figures 4 and 5) of metal or other suitable material at one end and a gudgeon or lug 13 supported by the arms 14 integral therewith. A coarse mesh basket 15 encloses a finer mesh basket 16 and both are soldered to the ring 12 or otherwise secured thereto. The opposite end of the basket is closed by a foraminous plate 17 also soldered to the screens. The wall 8 has an opening 18 therein to receive the screen and the flange 19 of the ring 12 abuts this wall. An opening 21 in the outer wall is closed by a cover 22 bolted in place by nuts 23 or other suitable means. The cover has a central lug 24 adapted to bear against the lug 13 of the spider 14. The unit consisting of the screen and spider is inserted into the casing through the opening 21 and is pressed against the retaining wall 8 by engagement of the lug 24 on the cover with the lug 13 on the spider. A plurality of lugs 24' support the screen at its closed end.

Figures 7, 8:
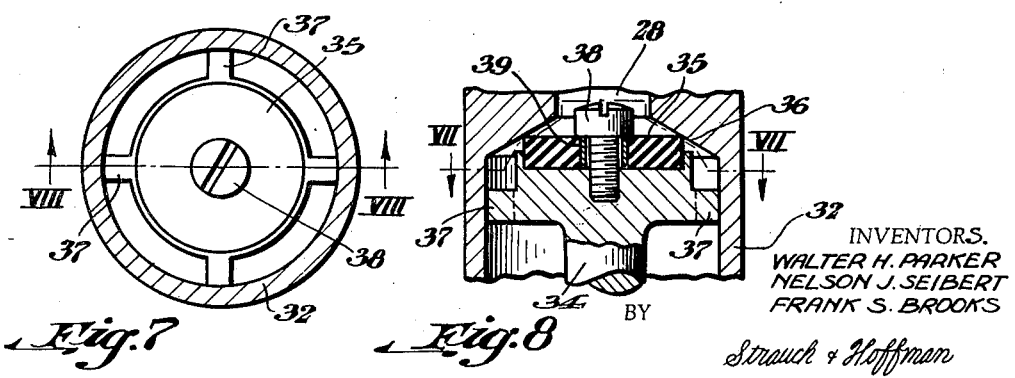
Figure 7 is a section view of the valve taken on line VII—VII of Figure 8.
Figure 8 is an enlarged section view of the valve taken on line VIII—VIII of Figure 7.

The strainer chamber is separated from settling chamber 26 by a dividing wall 25 (Figures 3 and 4). The baffle 25 and strainer 11 assist in cutting down and breaking up the velocity of the incoming liquid so that it overflows into the settling chamber 26 in a substantially quiescent state which allows entrained gas or vapors therein to rise to the top. A baffle wall 30 at the outlet end provides a passage 30' communicating with the outlet 5. Thus settling chamber 26 functions as and may be termed a still box. A gas or vapor vent 28 (Figures 3 and 6) is provided to permit escape of gas which accumulates in the top of the settling chamber. This vent consists of a flanged casting 29 bolted or otherwise suitably secured to a cover 31 bolted to the casing 4, and having a depending cylindrical skirt 32 with lateral openings 33 therein. A valve plunger 34 operates in the skirt 32, this valve member having a recess in its end carrying a composition seat 35 (Figures 6 and 8) held in place by a screw 38 passing through a metal bushing 39, and is adapted to seat against the tapered seat 36 of the outlet 28. The plunger 34 is guided in its reciprocating movement by the guide lugs 37 which contact the interior wall of the cylinder 32.

Figure 2:
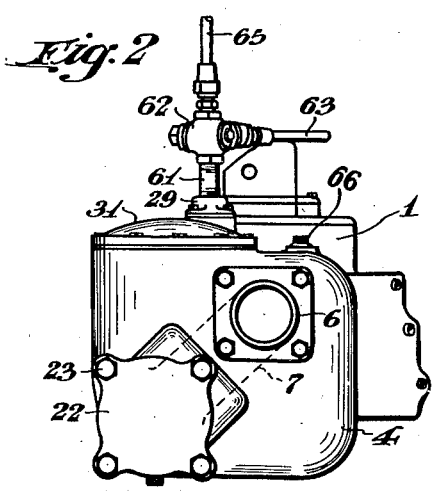
Figure 2 is an end elevation of the strainer and air eliminator housing taken in the direction of the arrow II of Figure 1.

A pivot member 41 is threaded into the cover 31 (Figures 3 and 6) and is locked in position by a lock nut 42. The end of this pivot member is bifurcated as shown at 43 and receives a lever 45 mounted to swing about a pivot pin 46 held in place by a cotter pin 47 or other suitable means. The end of the valve plunger 34 is bifurcated as indicated at 49 and is similarly pivoted by a pin 51 to the lever 45 intermediate its end. A second pivot member 52 is likewise threaded into the cover and locked in place by a lock nut 53, this pivot member likewise having a bifurcated end 54 in which a float lever 55 is suitably pivoted on the pivot pin 56. The end of lever 45 carries a link 57 pivoted thereto at 60 and pivoted at 58 to the float lever 55 intermediate its end, and the end of float lever 55 carries a hollow ball float 59 of any suitable construction threaded or otherwise suitably secured on the end of the float lever 55. It will be apparent that upward movement of the float 59 is transmitted and reduced by lever 55 through the link 57 and lever 45 to the valve plunger 34. A hook 60 secured to the cover 31 limits the lowest movement of float lever 55. The vent 28 has a tube 61 (Figures 1, 2, and 3) suitably connected thereto to which is secured a three-way plug cock 62, and a tube 63 by-passes the meter and is connected at 64 to the outlet 3 of the meter. Another tube 65 similarly is connected to the other outlet of the three-way valve and may be vented to the atmosphere or connected back to the top of the supply tank.

In operation liquid enters at the inlet 6 and is conducted through passage 7 to the open end of the screen 11, and flows therethrough. As the liquid level in the casing rises it overflows the partition 25 and flows into the settling chamber 26 and as the level therein rises it causes the float 59 to rise. Movement of the float is transmitted to the float lever 55, link 57 and valve lever 45 to raise and seat the valve thereby closing outlet 28. A suitable amount of play is provided between the various pivots and levers so that there is no canting of valve 34 in sleeve 32 with consequent binding therein. While the specific form of valve mechanism disclosed has been found to be most advantageous, other mechanisms may be employed if desired. From the settling chamber 26 the liquid is discharged through the outlet passage 30' into the meter 1 and is discharged therefrom through the meter outlet 3. As gas or vapor settles out of the liquid in chamber 26 it rises to the top and tends to force back the liquid therein, the float 59 following the liquid level, until movement thereof is sufficient to open the valve 34 and permit escape of gas. With the cock 62 in proper position the gas which escapes through the outlet 28 passes through the tube 65 into the air or back into the air space in the delivery tank. When the gas escapes it permits the liquid in settling chamber 26 to again rise and close the air escape valve through operation of float 59.

When connected for use as a vacuum breaker, the cock 62 is turned to connect line 63 with pipe 61. When the supply of fluid to inlet 6 stops, as for example when the tank is empty, the liquid will continue to flow out of the discharge 5 of the casing 4 until the level of liquid in chamber 26 falls low enough to cause the float 59 to open the vent valve 34. Continued flow of liquid through the outlet pipe 3 does not suck air through the meter by the syphoning action of liquid in the discharge line. Instead, air from inlet 6 is drawn through the discharge vent 28 and by-pass pipe 63 into the outlet side of the meter, to break the vacuum in the discharge line and permit complete and rapid discharge of its contents.

In the event that it is desired to maintain a connection through by-pass 63 to the outlet side of the meter and at the same time, pass escaping gas or vapors into the air or back into the delivery tank, plug 66 may be removed and a suitable pipe connection substituted therefor to conduct the gases where desired.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In an apparatus of the character described, a casing having inlet and outlet connections, a baffle wall in said casing extending from the bottom part way to the top to form a screening chamber and a settling chamber therein, a second baffle wall forming with the casing wall a passageway from said inlet connection to the screening chamber having a hole therethrough, a cylindrical screen extending through said hole, means to secure said screen in position, the liquid overflowing the first baffle wall into the settling chamber, an air release valve adjacent the top of said settling chamber, a float in said settling chamber, means to transmit motion of said float to said valve, and a baffle forming with the casing wall a passageway leading from the settling chamber to said outlet connection.

2. In an apparatus of the character described, a casing having inlet and outlet connections, a baffle wall extending from the bottom part way to the top and dividing the casing into screening and settling chambers, a second baffle wall forming with the casing wall a passageway from one of said connections to one end of the screening chamber and having a hole therethrough, a reenforcing member, an open ended cylindrical screen extending through said hole into the screening chamber and secured to said reenforcing member, means for holding said reenforcing member against said second named baffle wall, a float operated valve in the settling chamber to permit the escape of vapors therefrom, and a baffle forming with the casing wall a passageway leading from the settling chamber to another of said connections.

3. In an apparatus of the character described, a casing having inlet and outlet connections, and an opening at one side thereof, a baffle wall extending from the bottom part way to the top and dividing said casing into screening and settling chambers, a second baffle forming with the casing wall a passage leading from one of said connections to one end of said screening chamber and having a hole therethrough, a reenforcing member, an open ended cylindrical screen extending through said hole into the screening chamber and secured to said reenforcing member, said reenforcing member comprising a flanged annulus and radial arms forming a lug at their center, a cover for closing the opening in the casing and adapted to bear against said lug to hold said screen in place, a float operated valve in said settling chamber, and a baffle forming with the casing wall a passage leading from the settling chamber to another of said connections.

WALTER H. PARKER.
NELSON J. SEIBERT.
FRANK S. BROOKS.